United States Patent
Ikebe et al.

(10) Patent No.: US 11,616,677 B2
(45) Date of Patent: Mar. 28, 2023

(54) RECEIVING DEVICE, MOBILE TERMINAL TEST APPARATUS PROVIDED WITH RECEIVING DEVICE, AND MOBILE TERMINAL TEST METHOD

(71) Applicant: ANRITSU CORPORATION, Kanagawa (JP)

(72) Inventors: Takasumi Ikebe, Kanagawa (JP); Kenji Goto, Kanagawa (JP); Mayfor Dangkiw, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 17/481,858

(22) Filed: Sep. 22, 2021

(65) Prior Publication Data

US 2022/0109602 A1   Apr. 7, 2022

(30) Foreign Application Priority Data

Oct. 7, 2020  (JP) .............................. JP2020-169633

(51) Int. Cl.
*H04L 27/26* (2006.01)
*H04B 17/10* (2015.01)

(52) U.S. Cl.
CPC ....... *H04L 27/26524* (2021.01); *H04B 17/10* (2015.01)

(58) Field of Classification Search
CPC .......................... H04L 27/26524; H04B 17/10
See application file for complete search history.

(56) References Cited

U.S. PATENT DOCUMENTS

| 2018/0091346 | A1* | 3/2018 | Lee ................... H04L 27/26524 |
| 2019/0280818 | A1* | 9/2019 | Renfors ............... H04L 5/0007 |

FOREIGN PATENT DOCUMENTS

JP            2019-153963 A      9/2019

* cited by examiner

*Primary Examiner* — Janice N Tieu
(74) *Attorney, Agent, or Firm* — Pearne & Gordon LLP

(57) ABSTRACT

A receiving device includes a reception unit 10 that samples a signal to be measured a transmitted from a DUT 2 and acquires a sample signal d; an FFT processing unit 21 that performs an FFT process by multiplying the sample signal; a signal length calculation unit 31 that calculates a signal length of the signal to be measured from the sample signal; a comparing unit 33 that compares the calculated signal length of the signal to be measured with a first FFT length conforming to a communication standard; and an FFT length setting unit 34 that, when as a result of the comparison by the comparing unit, the signal length is shorter than the first FFT length, sets a second FFT length shorter than the signal length of the signal to be measured, as the FFT length of the FFT process by the FFT processing unit.

9 Claims, 7 Drawing Sheets

RECEIVING DEVICE, MOBILE TERMINAL TEST APPARATUS PROVIDED WITH RECEIVING DEVICE, AND MOBILE TERMINAL TEST METHOD

TECHNICAL FIELD

The present invention relates to a receiving device, a mobile terminal test apparatus provided with the receiving device, and a mobile terminal test method.

BACKGROUND ART

In the related art, a transmission test for analyzing a signal transmitted from a Device Under Test (DUT) such as a mobile communication terminal and checking the transmission performance of the DUT has been performed using a mobile terminal test apparatus. The signal transmitted from the DUT is a modulation signal modulated according to a communication standard such as a wireless Local Area Network (LAN), Long Term Evolution (LTE), or 5G New Radio (NR).

In wideband wireless transmission systems such as wireless LAN, LTE, and 5G NR, the Orthogonal Frequency Division Multiplexing (OFDM) method having a good frequency utilization efficiency is widely used as the modulation method. The OFDM method is a block transmission method that synchronizes every predetermined data block. Specifically, the data sequence is demultiplexed on the transmitting side, converted into parallel data, mapped to each subcarrier, and then an Inverse Fast Fourier Transform (IFFT) process, D/A transformation, orthogonal modulation, or the like are performed to obtain a transmission signal. In addition, after conversion to a signal in the time domain by an IFFT process, a part of the rear end of the signal is added to the front of the signal as a guard interval to make it resistant to inter-symbol interference due to multipath fading.

The mobile terminal test apparatus receives the modulation signal generated in this manner, demodulates the modulation signal, and performs signal analysis. In the demodulation, a Fast Fourier Transform (FFT) process is performed (see, for example, Patent Document 1).

Patent Document 1 discloses an apparatus that receives a signal transmitted from a DUT, performs an FFT process on the received signal, analyzes the received signal, and measures transmission characteristics such as transmission power and modulation accuracy.

RELATED ART DOCUMENT

Patent Document

[Patent Document 1] JP-A-2019-153963

DISCLOSURE OF THE INVENTION

Problem that the Invention is to Solve

Generally, in a DUT transmission test, a signal having a predetermined signal length conforming to the communication standard is subjected to an FFT process and analyzed to measure the transmission characteristics of the DUT. In the FFT process, the signal to be measured is multiplied by the window function to cut out the signal, and the FFT operation is performed on the signal portion. However, there are cases where it is desired to perform an FFT process and analyze a signal having a short signal length that does not conform to the communication standard to measure the transmission characteristics of the DUT.

In this FFT process, the FFT Length is uniquely determined by the Uplink Bandwidth and the Subcarrier Spacing specified in the communication standard. Therefore, for example, when the measurement target is a Physical Uplink Shared CHannel (PUSCH) and the number of symbols is small, the number of samples of the PUSCH to be measured may be smaller than the FFT length. In other words, the signal length of the signal to be measured may be shorter than the section width (domain width) of the window function used in the FFT process. As a result, there is a problem that in the FFT process, an appropriate result with high reliability cannot be obtained and a measurement error occurs. For example, in the power measurement, a value smaller than expected is obtained.

As described above, there are cases where it is desired to perform an FFT process and analyze a signal having a short signal length that does not conform to the communication standard to measure the transmission characteristics of the DUT. However, in the apparatus in the related art described in Patent Document 1, in the transmission test of the DUT, the measurement of the transmission characteristics of a signal that does not conform to the communication standard, for example, a signal having a short signal length outside the standard has not been considered.

The present invention has been made to solve the above-described problems in the related art, and an object of the present invention is to provide a receiving device, a mobile terminal test apparatus provided with the receiving device, and a mobile terminal test method that are capable of handling a case where the signal length of a signal to be measured is short outside the standard in a test involving an FFT process, and performing the FFT process with high reliability.

Means for Solving the Problem

In order to achieve the above object, a receiving device of the present invention includes a reception unit (10) that samples a signal to be measured (a) transmitted from a device under test (2) and acquires a sample signal (d); an FFT processing unit (21) that performs an FFT process by multiplying the sample signal acquired by the reception unit by a window function; a signal length calculation unit (31) that calculates a signal length of the signal to be measured from the sample signal acquired by the reception unit; a comparing unit (33) that compares the calculated signal length of the signal to be measured with a first FFT length conforming to a communication standard; and an FFT length setting unit (34) that, when as a result of the comparison by the comparing unit, the signal length of the signal to be measured is shorter than the first FFT length, instead of the first FFT length, sets a second FFT length shorter than the signal length of the signal to be measured, as the FFT length of the FFT process by the FFT processing unit.

As described above, in the receiving device of the present invention, when the signal length of the signal to be measured is shorter than the first FFT length specified in the communication standard, instead of the first FFT length, the FFT length setting unit may set the second FFT length that is shorter than the signal length of the signal to be measured, and is outside the standard, as the FFT length of the FFT process by the FFT processing unit. With this configuration, it is possible to prevent the FFT process from being performed on a section in which there is substantially no data in the signal to be measured. Thus, the receiving device of the present invention is able to, in a test involving the FFT process, handle not only a signal to be measured conforming to the communication standard but also a case where the signal length of a signal to be measured is short outside the standard, and perform the FFT process with high reliability.

Further, the receiving device of the present invention may further include a resolution bandwidth setting unit (35) that, when as the result of the comparison by the comparing unit, the signal length of the signal to be measured is shorter than the first FFT length, instead of a predetermined first resolution bandwidth conforming to the communication standard as a resolution bandwidth of the window function used in the FFT process, sets a second resolution bandwidth larger than the first resolution bandwidth, as the resolution bandwidth of the window function.

When the FFT length is shortened by the FFT length setting unit, the sample interval on the frequency axis becomes large, and if the window function specified in the communication standard remains, the maximum error in the power measurement of the signal to be measured becomes large. In the receiving device of the present invention, instead of the predetermined first resolution bandwidth conforming to the communication standard as the resolution bandwidth of the window function used in an FFT process, the resolution bandwidth setting unit may set a second resolution bandwidth that is larger than the first resolution bandwidth, as the resolution bandwidth of the window function. With this configuration, an increase in the maximum error in power measurement due to the shortening of the FFT length can be suppressed.

Further, in the receiving device of the present invention, the resolution bandwidth setting unit, when as the result of the comparison by the comparing unit, the signal length of the signal to be measured is shorter than the first FFT length, may set the second resolution bandwidth as the resolution bandwidth of the window function such that a maximum error assumed in power measurement of the signal to be measured falls within a predetermined allowable range, based on information on the window function in a frequency domain display of a windowing process.

With this configuration, an increase in the maximum error in power measurement due to changing the FFT length in the FFT process to a second FFT length shorter than the specified first FFT length can be reliably suppressed.

Further, in the receiving device of the present invention, the FFT length setting unit, when as the result of the comparison by the comparing unit, the signal length of the signal to be measured is shorter than the first FFT length, may set the second FFT length to maximum $2^n$ which is equal to or less than the number of samples of one symbol at a sampling rate of the sampling performed by the reception unit, where n is a natural number.

With this configuration, even when the signal length of the signal to be measured is only one symbol at worst, the FFT process can be appropriately performed.

Further, a mobile terminal test apparatus of the present invention includes a receiving device including a reception unit (10) that samples a signal to be measured (a), transmitted from a device under test (2), and acquires a sample signal (d), an FFT processing unit (21) that performs an FFT process by multiplying the sample signal acquired by the reception unit by a window function, a signal length calculation unit (31) that calculates a signal length of the signal to be measured from the sample signal acquired by the reception unit, a comparing unit (33) that compares the calculated signal length of the signal to be measured with a first FFT length conforming to a communication standard, and an FFT length setting unit (34) that when as a result of the comparison by the comparing unit, the signal length of the signal to be measured is shorter than the first FFT length, instead of the first FFT length, sets a second FFT length shorter than the signal length of the signal to be measured, as the FFT length of the FFT process by the FFT processing unit; an analysis unit (40) that analyzes a signal obtained by the FFT processing unit; and a display unit (50) that displays a result of the analysis performed by the analysis unit.

As described above, in the mobile terminal test apparatus of the present invention, when the signal length of the signal to be measured is shorter than the first FFT length conforming to the communication standard, instead of the first FFT length, the FFT length setting unit of the receiving device may set a second FFT length that is shorter than the signal length of the signal to be measured, and is outside the standard, as the FFT length of the FFT process by the FFT processing unit. With this configuration, it is possible to prevent the FFT process from being performed on a section in which there is substantially no data in the signal to be measured. Thus, in a test involving the FFT process, it is possible to handle not only a signal to be measured conforming to the communication standard but also a case where the signal length of a signal to be measured is short outside the standard, and perform the FFT process with high reliability, thereby accurately testing the mobile communication terminal.

Further, in a case where the receiving device includes a resolution bandwidth setting unit, when the signal length of the signal to be measured is shorter than the first FFT length conforming to the communication standard, instead of the predetermined first resolution bandwidth conforming to the communication standard as the resolution bandwidth of the window function used in an FFT process, a second resolution bandwidth that is larger than the first resolution bandwidth may be set as the resolution bandwidth of the window function. With this configuration, the maximum error in the power measurement due to the shortened FFT length can be reduced, whereby the test of the mobile communication terminal can be performed with high accuracy.

The mobile terminal test apparatus of the present invention may further include a resolution bandwidth setting unit that, when as the result of the comparison by the comparing unit, the signal length of the signal to be measured is shorter than the first FFT length, instead of a predetermined first resolution bandwidth conforming to the communication standard as a resolution bandwidth of the window function used in the FFT process, sets a second resolution bandwidth larger than the first resolution bandwidth, as the resolution bandwidth of the window function.

In the mobile terminal test apparatus of the present invention, the resolution bandwidth setting unit, when as the result of the comparison by the comparing unit, the signal length of the signal to be measured is shorter than the first FFT length, may set the second resolution bandwidth as the resolution bandwidth of the window function such that a maximum error assumed in power measurement of the signal to be measured falls within a predetermined allowable range, based on information on the window function in a frequency domain display of a windowing process.

In the mobile terminal test apparatus of the present invention, the FFT length setting unit, when as the result of the comparison by the comparing unit, the signal length of the signal to be measured is shorter than the first FFT length, may set the second FFT length to maximum $2^n$ which is equal to or less than the number of samples of one symbol at the sampling rate of the sampling performed by the reception unit, where n is a natural number.

Further, a mobile terminal test method of the present invention includes a reception step (S2 to S5) of sampling a signal to be measured (a) transmitted from a device under test (2) and acquiring a sample signal (d); an FFT processing step (S7) of performing an FFT process by multiplying the sample signal acquired in the reception step by a window function; a signal length calculation step (S21) of calculating a signal length of the signal to be measured from the sample signal acquired in the reception step; a comparison step (S22) of comparing the calculated signal length of the signal to be measured with a first FFT length conforming to a communication standard as an FFT length of the FFT process; an FFT length setting step (S23) of, when as a result of the comparison in the comparison step, the signal length of the signal to be measured is shorter than the first FFT length, instead of the first FFT length, setting a second FFT length shorter than the signal length of the signal to be measured, as the FFT length of the FFT process in the FFT processing step; a resolution bandwidth setting step (S24) of setting, when as a result of the comparison in the comparison step, the signal length of the signal to be measured is shorter than the first FFT length, instead of a predetermined first resolution bandwidth conforming to the communication standard as the resolution bandwidth of the window function used in the FFT process, a second resolution bandwidth larger than the first resolution bandwidth as the resolution bandwidth of the window function; an analysis step (S9) of analyzing a signal obtained in the FFT processing step; and a display step (S10) of displaying a result of the analysis in the analysis step.

As described above, in the mobile terminal test method of the present invention, in the FFT length setting step, when the signal length of the signal to be measured is shorter than the first FFT length conforming to the communication standard, instead of the first FFT length, a second FFT length that is shorter than the signal length of the signal to be measured and is outside the standard may be set as the FFT length of the FFT process. With this configuration, it is possible to prevent the FFT process from being performed on a section in which there is substantially no data in the signal to be measured. Further, in the resolution bandwidth setting step, instead of the predetermined first resolution bandwidth conforming to the communication standard as the resolution bandwidth of the window function used in an FFT process, a second resolution bandwidth larger than the first resolution bandwidth may be set as the resolution bandwidth of the window function. With this configuration, the maximum error in power measurement due to the shortened FFT length can be reduced. Therefore, the mobile terminal test method of the present invention can, in a test involving the FFT process, handle not only a signal to be measured conforming to the communication standard but also a case where the signal length of a signal to be measured is short outside the standard, and perform the FFT process with high reliability, thereby accurately testing the mobile communication terminal.

Advantage of the Invention

According to the present invention, it is possible to provide a receiving device, a mobile terminal test apparatus provided with the receiving device, and a mobile terminal test method that can handle a case where the signal length of a signal to be measured is short outside the standard in a test involving an FFT process and perform an FFT process with high reliability.

BEST MODE FOR CARRYING OUT THE INVENTION

Hereinafter, embodiments of the present invention will be described with reference to the drawings.

Figure 1:
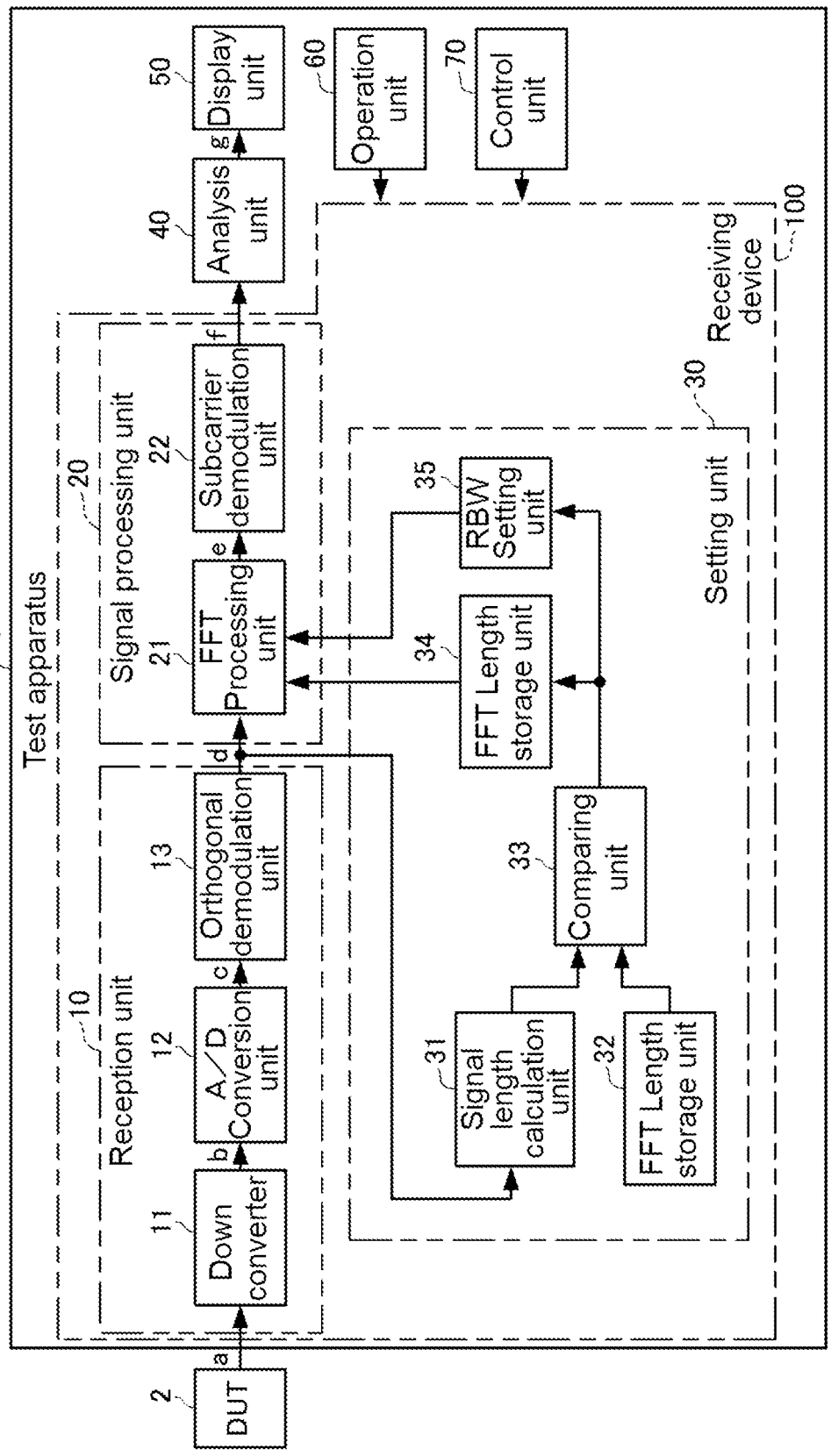
FIG. 1 is a block diagram illustrating a configuration of a mobile terminal test apparatus according to an embodiment of the present invention.

A mobile terminal test apparatus 1 (hereinafter, also referred to as a test apparatus) according to the embodiment of the present invention tests the transmission performance of a device under test (DUT) 2 by receiving the modulation signal a transmitted from the DUT 2 and performing an FFT process on the received modulation signal to analyze it. For this purpose, as shown in FIG. 1, the test apparatus 1 includes a reception unit 10, a signal processing unit 20, a setting unit 30, an analysis unit 40, a display unit 50, an operation unit 60, and a control unit 70. The portion including the reception unit 10, the signal processing unit 20, and the setting unit 30 is also referred to as a receiving device 100. The test apparatus 1 may be, for example, a signal analyzer or a spectrum analyzer as long as it utilizes an FFT process.

Examples of the DUT 2 include, but are not limited to, mobile communication terminals such as smartphones, mobile phones, and tablet terminals. The modulation signal a transmitted from the DUT 2 is an OFDM modulation signal modulated by, for example, an orthogonal frequency division multiplexing (OFDM) method according to a communication standard such as LTE, LTE-Advanced, 5G NR, or wireless LAN. The modulation signal a is also referred to as a signal to be measured. In the present embodiment, 5G NR is assumed as the communication standard, and the modulation signal modulated by the OFDM method is received, but the communication standard and the modulation method are not limited to this. Hereinafter, each component will be described.

(Reception Unit)

The reception unit 10 receives the modulation signal a (OFDM modulation signal) transmitted from the DUT 2 via an antenna or by wire, and performs frequency conversion and samples the received modulation signal. Specifically, the reception unit 10 includes a down converter 11, an analog-to-digital conversion unit (A/D conversion unit) 12, and an orthogonal demodulation unit 13.

The down converter 11 includes a mixer and a local oscillator, inputs the modulation signal a transmitted from the DUT 2 and the local signal generated by the local oscillator to the mixer, down-converts the input signals, and generates an intermediate frequency (IF) signal b. The intermediate frequency signal b is sent to the A/D conversion unit 12.

The A/D conversion unit 12 samples the intermediate frequency signal b, which is frequency-converted by the down converter 11, and converts the sampled intermediate frequency signal b from an analog signal to a digital signal. An obtained digital intermediate frequency signal c is sent to the orthogonal demodulation unit 13.

The orthogonal demodulation unit 13 frequency-converts the digital intermediate frequency signal c output from the A/D conversion unit 12 into a baseband signal, and orthogonally demodulates the intermediate frequency signal c into an I-phase component and a Q-phase component. The obtained orthogonal demodulation signal d is sent to the signal processing unit 20 and the setting unit 30. The orthogonal demodulation signal d is a complex signal and is also referred to as a sample signal or a sample sequence.

In the above description, in the reception unit 10, the modulation signal is converted into an intermediate frequency signal by the down converter 11, but may be converted into a baseband signal by the down converter 11. Further, a signal synchronization unit may be provided between the orthogonal demodulation unit 13 and the signal processing unit 20, and symbols or frames may be synchronized with respect to the orthogonal demodulation signal d.

As will be described in detail later, the setting unit 30 sets or changes parameters that specify the FFT process performed by the FFT processing unit 21 of the signal processing unit 20.

(Signal Processing Unit)

The signal processing unit 20 performs OFDM demodulation on the orthogonal demodulation signal d output from the orthogonal demodulation unit 13 of the reception unit 10. Specifically, the signal processing unit 20 includes an FFT processing unit 21 and a subcarrier demodulation unit 22.

The FFT processing unit 21 performs an FFT process by multiplying the orthogonal demodulation signal d (sample signal) acquired by the reception unit 10 by a window function to generate a frequency domain signal e. Specifically, the FFT processing unit 21 performs the FFT operation while shifting the window function in a predetermined sweep section (FFT sweep). Parameters or conditions that specify the FFT process include an FFT length, a window function, a resolution bandwidth (RBW) of the window function, an FFT sweep method, and the like. All or part of these FFT processing conditions may be initially set in the FFT processing unit 21, with the conditions specified in the communication standard as the default, or may be input by the user operating the operation unit 60. As the window function, any type of window function such as a Gaussian window can be used.

If necessary, Cyclic Prefix (CP) is removed from each symbol of the orthogonal demodulation signal d, before the FFT process is performed by the FFT processing unit 21. The frequency domain signal e generated by the FFT processing unit 21 is sent to the subcarrier demodulation unit 22, and, if necessary, the analysis unit 40.

A transmission line estimation and transmission line correction unit may be provided between the FFT processing unit 21 and the subcarrier demodulation unit 22. The transmission line estimation and transmission line correction unit corrects the transmission line by estimating the transmission line using, for example, a pilot signal, with respect to the frequency domain signal e output from the FFT processing unit 21. When the transmission line estimation and transmission line correction unit is provided, the corrected frequency domain signal is sent to the subcarrier demodulation unit 22.

The subcarrier demodulation unit 22 performs a demodulation process on the frequency domain signal e for each subcarrier to generate an OFDM demodulation signal f. The OFDM demodulation signal f is sent to the analysis unit 40.

(Analysis Unit)

The analysis unit 40 is configured to measure and analyze, for example, transmission power, Error Vector Magnitude (EVM), constellation, spectrum, or the like, with respect to the OFDM demodulation signal f output from the subcarrier demodulation unit 22, and test the transmission performance of the DUT 2. The information g on the measurement and analysis result by the analysis unit 40 is sent to the display unit 50.

(Display Unit or the Like)

The display unit 50 includes a display device such as a liquid crystal display, and displays, on the display device, the test result of the DUT 2, including data and graphs of the measurement and analysis result sent from the analysis unit 40.

The operation unit 60 is operated by the user to set various parameters in addition to the measurement items, measurement conditions, and determination conditions when testing the DUT 2. Specifically, examples of the operation unit 60 include an input device such as a touch panel, a keyboard composed of hardware keys, a mouse or a dial, and a control circuit for controlling these.

The control unit 70 receives an input from the operation unit 60, sets various parameters, and controls functional units such as the reception unit 10, the signal processing unit 20, the setting unit 30, the analysis unit 40, and the display unit 50.

(Setting Unit)

Next, the setting unit 30 will be described with reference to the drawings.

The setting unit 30 sets parameters that specify the FFT process performed by the FFT processing unit 21 of the signal processing unit 20. Specifically, as shown in FIG. 1, the setting unit 30 includes a signal length calculation unit 31, an FFT length storage unit 32, a comparing unit 33, an FFT length setting unit 34, and an RBW setting unit 35.

<FFT Process>

First, the FFT process performed by the FFT processing unit 21 will be described.

The orthogonal demodulation signal d output from the orthogonal demodulation unit 13 is time-series (time domain) sample sequences $S(1), \ldots, S(N)$ acquired at the sampling rate SR by the A/D conversion unit 12. Here, N is a natural number. Each sample $S(k)$ is a complex number having an I-phase component and a Q-phase component. Here, k is a sample number, which is a natural number of $1 \leq k \leq N$. The total time length of the time-series sample sequences $S(1), \ldots, S(N)$ is set to T1 (see FIG. 2). Since the sampling rate SR is constant, the time, time length, and section length may be expressed by the number of samples below.

The FFT processing unit 21 performs an FFT process on the sample sequence S(k) having a time length T1. In the FFT process, the sample sequence S(k) having the length T1 is multiplied by the window function w(t) having the section length T2 to cut out the signal. Here, the time t is associated with the sample number m and can be expressed as t(m). The cut-out data sequence d(m) of the time length T2 is expressed by the following expression.

d(m)=S(m)·w(t(m)), 1≤m≤M≤N, where m is a natural number and M is the number of data pieces in the cut-out data sequence. The multiplication of the sample signal (sample sequence) and the window function on the time axis corresponds to the convolution calculation of the sample signal and the window function on the frequency axis.

In general, the section length T2 of the window function w is equal to the FFT length. That is, when the number of samples included in the section length T2 of the window function w is M, the FFT length is equal to the number of M samples.

A known FFT operation is performed on the cut-out data sequence d(m) of the time length T2 to obtain the data sequence D(ωm) on the frequency domain. That is, the components of the fundamental wave (ω1) and its harmonics (ω2, . . . , ωM) are obtained.

Figure 2:
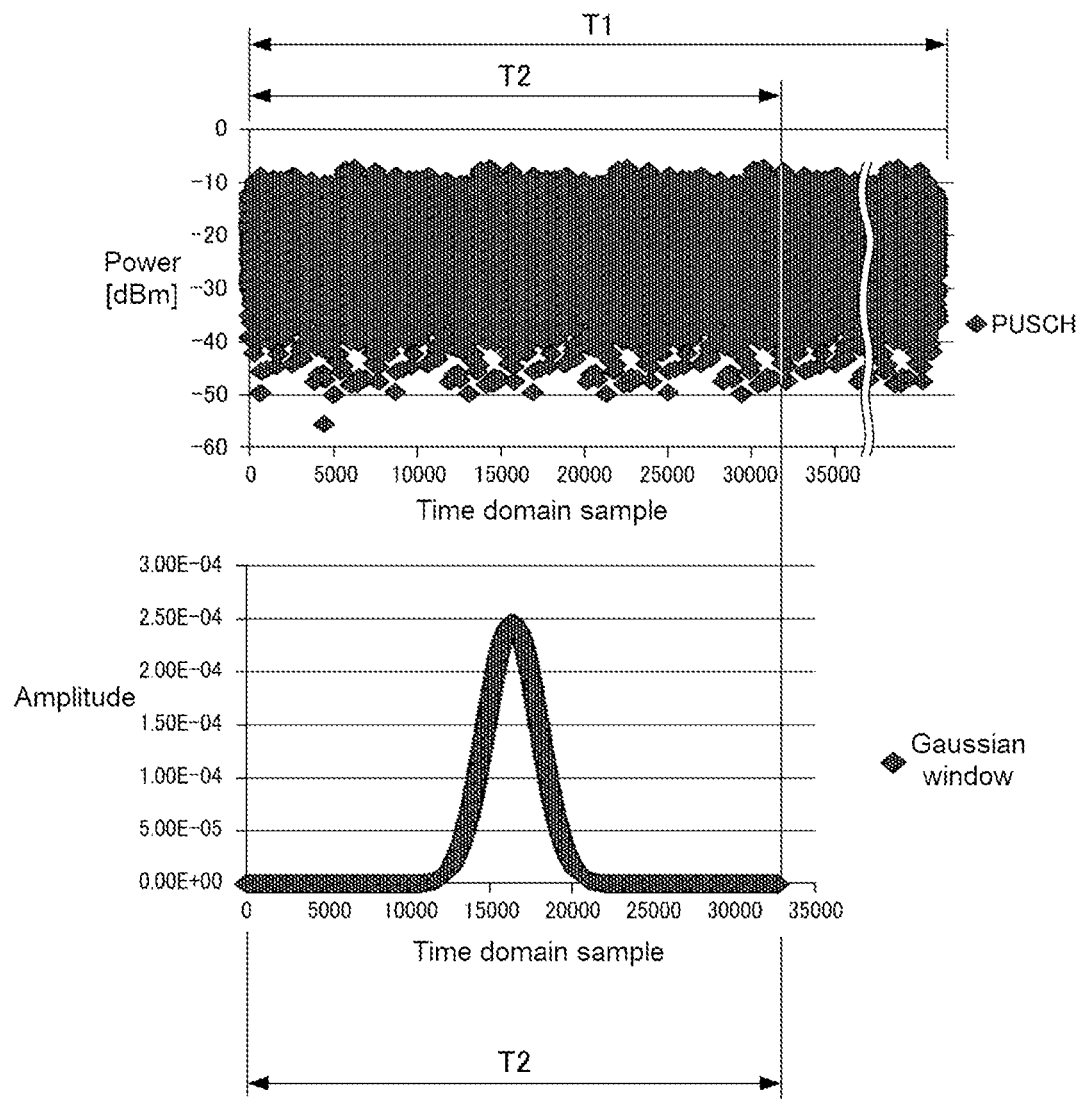
FIG. 2 is a diagram illustrating a relationship between a signal to be measured conforming to the communication standard and a window function.

FIG. 2 is a diagram illustrating a relationship between a signal to be measured (upper graph) conforming to the communication standard and a window function (lower graph) conforming to the communication standard. In the example of FIG. 2, the signal to be measured is a PUSCH signal, and the window function is a Gaussian window. The time length T1 of the sample sequence (or symbol sequence) constituting the signal to be measured transmitted from the DUT 2 is greater than the section length T2 of the window function. In FIG. 2, the number of samples on the horizontal axis is scaled in the upper and lower graphs. As shown in FIG. 2, the part of the sample sequence corresponding to the main lobe of the window function is a region where substantial data having power equal to or higher than the reference value is present. Therefore, the signal can be cut out satisfactorily by multiplying the partial sample sequence of the time length T2 by the window function of the section length T2.

In this way, when T1 (time length of the signal to be measured)>T2 (section length of the window function), the cutout and FFT operation of a signal are repeated, while shifting the position (sample number) in the sample sequence S(k) for multiplying the window function. Such a process is also referred to as FFT sweep. The sweep is started when the start point (left end) of the window function matches the start point of the section (measurement section) of the sample sequence, the FFT operation is performed while shifting the window function to the right at a predetermined interval d, and when the end point (right end) of the window function is reached the end point of the measurement section, the process ends. The shift of the window function in the FFT sweep may be performed while overlapping the window functions or may be performed without overlapping the window functions.

Figure 3:
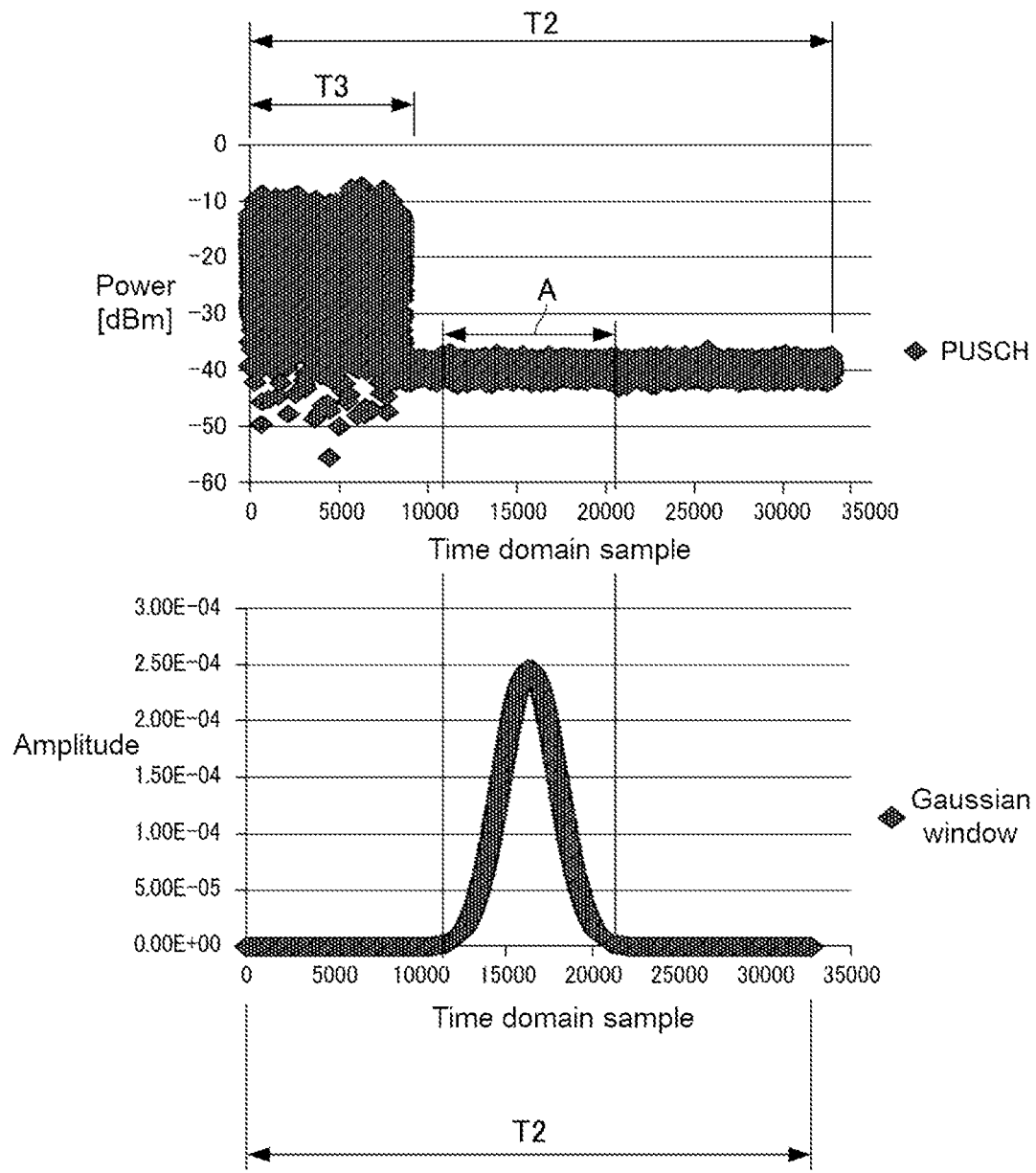
FIG. 3 is a diagram illustrating a relationship between a signal to be measured that does not conform to the communication standard and the window function.

FIG. 3 is a diagram illustrating a relationship between the signal to be measured (upper graph) that does not conform to the communication standard and the window function (lower graph). In the example of FIG. 3, the signal to be measured is a PUSCH signal, and the window function is a Gaussian window. The case where the time length T3 of the sample sequence constituting the signal to be measured transmitted from the DUT 2 is shorter than the section length T2 (that is, the FFT length) of the window function is shown.

In FIG. 3, the number of samples on the horizontal axis is scaled in the upper and lower graphs.

As described above, in the FFT process, the window function is applied to the signal to be measured, before the FFT process is performed. In the case of FIG. 3, there is substantially no signal in the part A of the signal to be measured corresponding to the main lobe portion of the window function, that is, the part A is a region where there is no substantial data having power equal to or higher than the reference value in the signal to be measured. Therefore, a region in which there is no substantial data is cut out, by multiplying the partial sample sequence of the time length T2 by the window function of the section length T2. By performing such multiplication, the section where there is substantially no signal to be measured is subject to FFT. Thus, for example, the power measurement result is about the noise floor or becomes smaller than the expected value. Such a phenomenon occurs because the FFT length is larger than the signal length of the signal to be measured.

Figure 4:
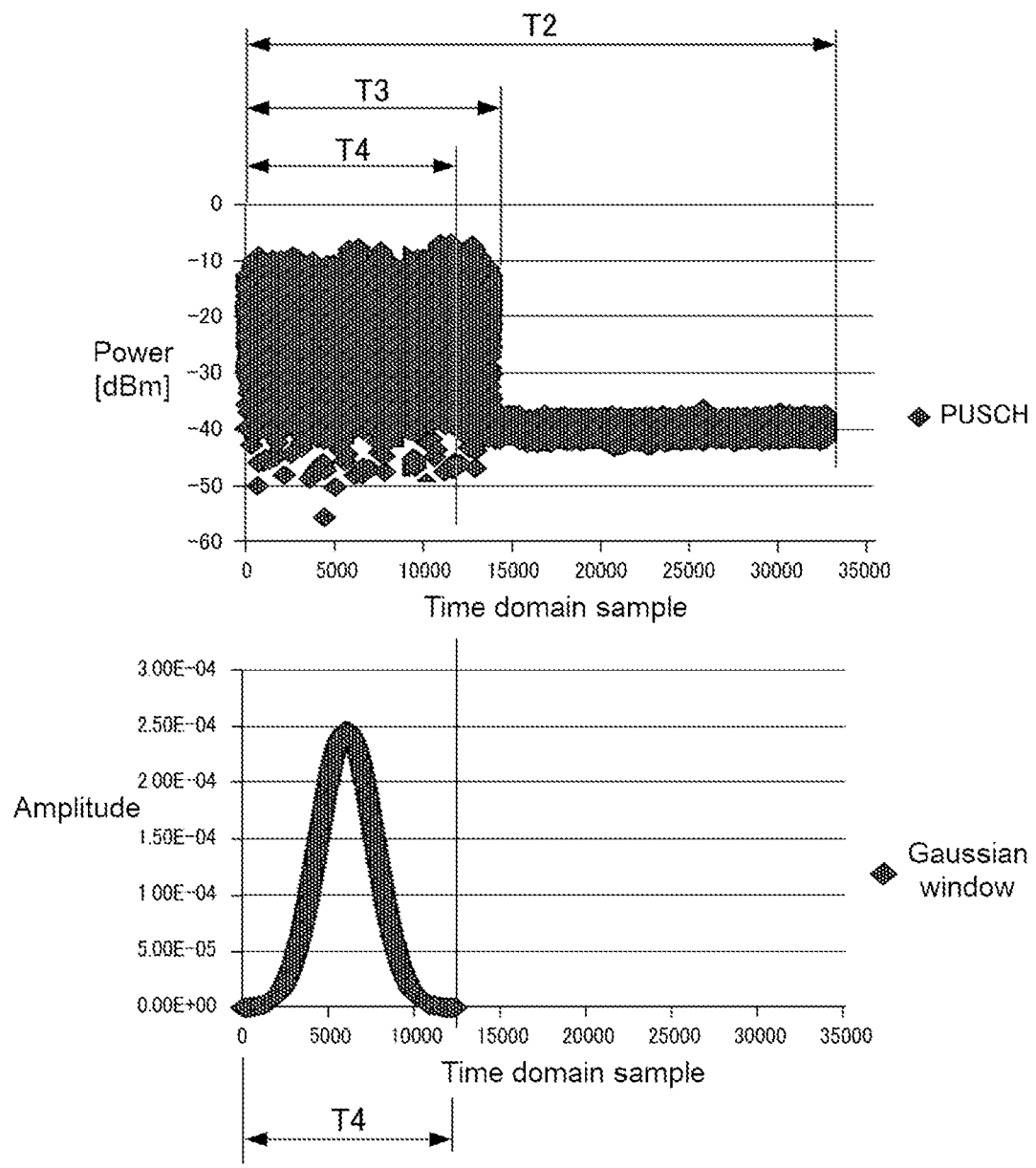
FIG. 4 is a diagram illustrating a window function used for the signal to be measured that does not conform to the communication standard in the embodiment of the present invention.

FIG. 4 is a diagram illustrating a window function used for the signal to be measured that does not conform to the communication standard in the embodiment of the present invention. When the time length T3 of the signal to be measured transmitted from DUT 2 is shorter than the section width T2 (that is, the first FFT length) of the window function, the window function is changed to a window function having a section length T4 shorter than the time length T3 of the signal to be measured. In other words, when the signal length T3 of the signal to be measured is shorter than the first FFT length T2, a second FFT length T4 that is outside the standard and is shorter than the signal length of the signal to be measured is adopted instead of the first FFT length.

Hereinafter, the components of the setting unit 30 will be described.

The signal length calculation unit 31 calculates the signal length of the signal to be measured from the orthogonal demodulation signal d (also referred to as a sample signal) acquired by the reception unit 10. Specifically, the signal length calculation unit 31 compares the power of each sample of the orthogonal demodulation signal d with a predetermined reference value, and determines that the signal is a substantial signal transmitted from the DUT 2 when the power is larger than the reference value. For example, in FIG. 3, the signal length of the signal to be measured is T3 [sample].

The FFT length storage unit 32 stores a predetermined first FFT length specified in the communication standard, as the FFT length of the FFT process applied to the sample signal acquired by the reception unit 10. For example, in FIG. 2, the first FFT length is T2 [sample].

The comparing unit 33 compares the signal length of the signal to be measured calculated by the signal length calculation unit 31 with the first FFT length stored in the FFT length storage unit 32. For example, in FIG. 2, T1 which is the signal length of the signal to be measured is compared with T2 which is the first FFT length. For example, in FIG. 3, T3 which is the signal length of the signal to be measured is compared with T2 which is the first FFT length.

When as a result of the comparison by the comparing unit 33, the signal length of the signal to be measured is shorter than the first FFT length, the FFT length setting unit (34) sets, instead of the first FFT length, a second FFT length which is shorter than the signal length of the signal to be measured and is outside the standard, as the FFT length of the FFT process by the FFT processing unit 21. For example, as shown in FIG. 3, when T3 which is the signal length of the signal to be measured is shorter than T2 which is the first FFT length, as shown in FIG. 4, a second FFT length T4 which is shorter than the signal length T3 of the signal to be measured is set as the FFT length of the FFT process in the FFT processing unit 21.

As described above, when the number of samples (signal length) of the I-phase component or Q-phase component of the signal to be measured is smaller than the FFT length (first FFT length) of the FFT process specified in the communication standard, the FFT length is shortened. The value of the FFT length adopted at that time is adjusted to the worst case (that is, at one symbol).

Specifically, the FFT length setting unit 34 sets the second FFT length to maximum 2' (power of 2) which is equal to or less than the number of samples of one symbol at the sampling rate of the sampling performed by the reception unit 10. Where n is a natural number. With this configuration, even when the signal length of the signal to be measured is only one symbol at worst, the FFT process can be appropriately performed. Further, since the second FFT length can be set to the shortest, the number of FFT sweeps can be increased, whereby the averaging process can be performed accurately.

The RBW setting unit 35 sets, when as a result of the comparison by the comparing unit 33, the signal length of the signal to be measured is shorter than the first FFT length, instead of a predetermined first RBW conforming to the communication standard as the RBW of the window function used in the FFT process, a second RBW larger than the first RBW, as the RBW of the window function.

Here, the RBW of the window function will be described.

As the window function w(t), for example, the following Gaussian window wG(t) is used.

$$w_G(t) = \exp\left\{-\frac{t^2}{2\sigma^2}\right\} \quad (1)$$

Where σ is the standard deviation.

The following expression is obtained by Fourier transforming Gaussian window wG(t).

$$W_G(\omega) = \sqrt{2}\,\sigma \cdot \exp\left\{-\frac{(\omega\sigma)^2}{2}\right\} \quad (2)$$

If RBW is defined by −3 dB bandwidth, the following expression is obtained from Expression (2).

$$\exp\left\{-\frac{(\omega_c\sigma)^2}{2}\right\} = \frac{1}{\sqrt{2}} \quad (3)$$

Further, ω that drops by −3 dB is given by the following expression.

$$\omega_c = 2\pi\frac{RBW}{2} = \pi \cdot RBW \quad (4)$$

The following expression is obtained from Expressions (3) and (4).

$$\sigma = \frac{\sqrt{\ln 2}}{\pi \cdot RBW} \quad (5)$$

Here, with reference to FIG. 5, the reason why the maximum error in the power measurement of the signal to be measured can be reduced by increasing the RBW will be described.

As described above, the window function is applied to the signal to be measured before performing the FFT operation. Applying a window function on the time axis corresponds to performing a convolution calculation on the frequency axis. The upper part of FIG. 5 schematically shows a state where the convolution calculation is performed on the frequency axis before the FFT length and RBW are changed (reset) (frequency domain display of windowing process). As shown in the above expression (2), the Fourier transform of the Gaussian window on the time axis becomes the Gaussian window on the frequency axis. In the convolution calculation, the Gaussian window W1 is translated on the frequency axis and multiplied by the signal to be measured. The maximum error ERmax assumed in the power measurement of the signal to be measured is determined according to the difference A(P0)−A(P1) between the amplitude value A(P0) at the peak P0 of the Gaussian window W1 and the amplitude value A(P1) at the intersection P1 of the adjacent Gaussian window W1. In the upper part of FIG. 5, the Gaussian window W1 is shown corresponding to three samples S1, S2, and S3 in the frequency domain for the sake of explanation, but the actual number of samples is usually larger than three.

Figure 5:
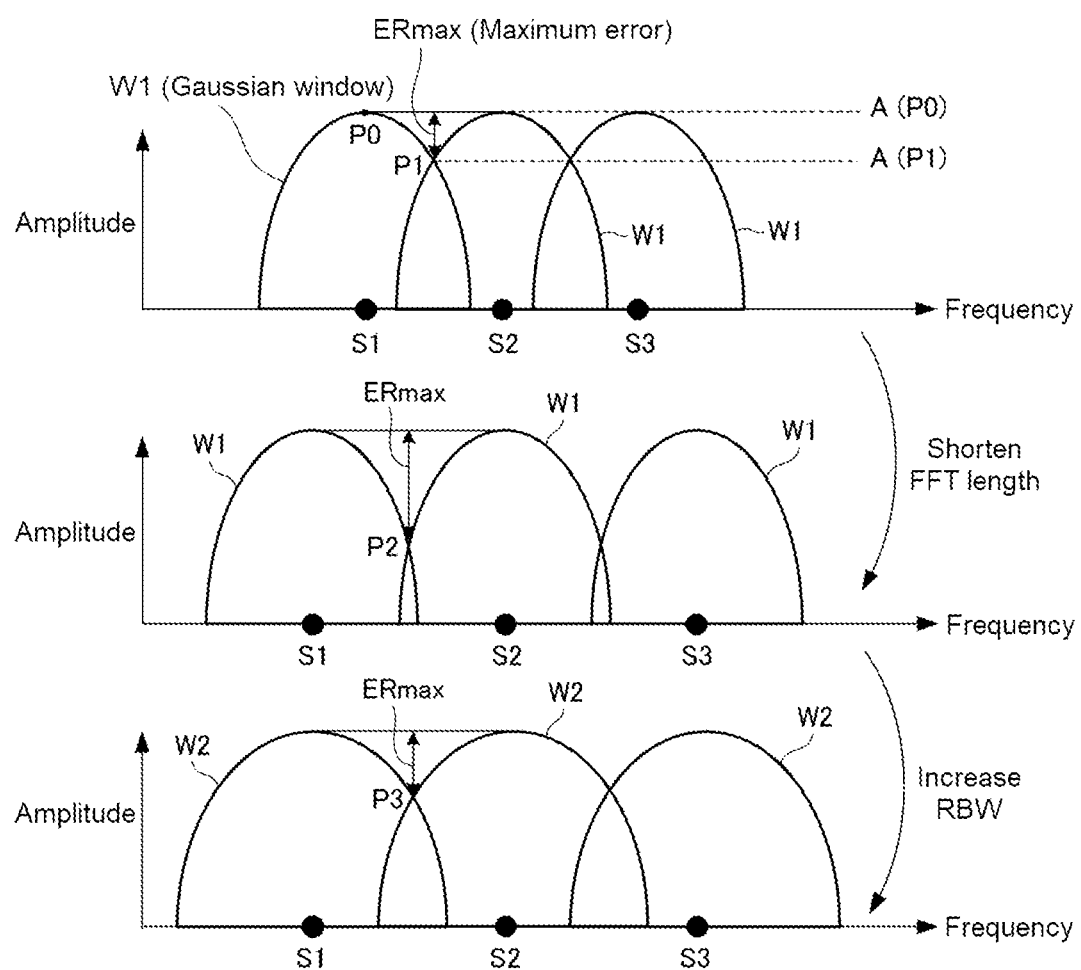
FIG. 5 is a diagram illustrating a principle of suppressing a maximum error in power measurement of a signal to be measured.

The middle part of FIG. 5 schematically shows a state where the convolution calculation is performed on the frequency axis in a state where the FFT length is changed to be shorter than the signal length from the state of the upper part of FIG. 5 (frequency domain display of windowing process). By shortening the FFT length, the intervals between the samples S1, S2, and S3 on the frequency axis become large. Thus, the amplitude value at the intersection P2 of the adjacent Gaussian window W1 becomes smaller, and the maximum error ERmax assumed in the power measurement becomes larger than in the upper part of FIG. 5.

The lower part of FIG. 5 schematically shows a state where the convolution calculation is performed on the frequency axis in a state where the RBW (that is, the width of the window function) is increased from the state of the middle part of FIG. 5 (frequency domain display of windowing process). It can be seen that by increasing the RBW, the amplitude value at the intersection P3 of the adjacent Gaussian windows W2 becomes large, and the maximum error ERmax assumed in the power measurement becomes smaller than in the middle part of FIG. 5.

The RBW setting unit 35 sets, when as a result of the comparison by the comparing unit 33, the signal length of the signal to be measured is shorter than the first FFT length, the second resolution bandwidth as a resolution bandwidth of the window function such that a maximum error assumed in the power measurement of the signal to be measured falls within a predetermined allowable range, based on information on the window function in a frequency domain display of a windowing process. For example, in the lower part of FIG. 5 (frequency domain display of windowing process), the second resolution bandwidth may be set such that the difference A(P0)−A(P1) between the amplitude value A(P0) at the peak P0 of the Gaussian window W2 and the amplitude value A(P1) at the intersection P1 of the adjacent Gaussian window W2 is smaller than a predetermined threshold. With this configuration, the maximum error in the power measurement of the signal to be measured can be reduced, and in particular, an increase in the maximum error in power measurement due to changing the FFT length in the FFT process to a second FFT length shorter than the specified first FFT length can be suppressed.

The mobile terminal test apparatus 1 and the receiving device 100 according to the present embodiment include individually or as a whole, a computer including, for example, a Central Processing Unit (CPU), a Read Only Memory (ROM), a Random Access Memory (RAM), an input/output interface, a storage device such as a hard disk, and the like. Thus, for example, some or all of the functions of the reception unit 10, the signal processing unit 20, the setting unit 30, the analysis unit 40, the display unit 50, the operation unit 60, the control unit 70, and the like can be achieved by reading the various processing programs stored in the ROM or the storage device into the RAM and executing the programs in the CPU.

Figure 6:
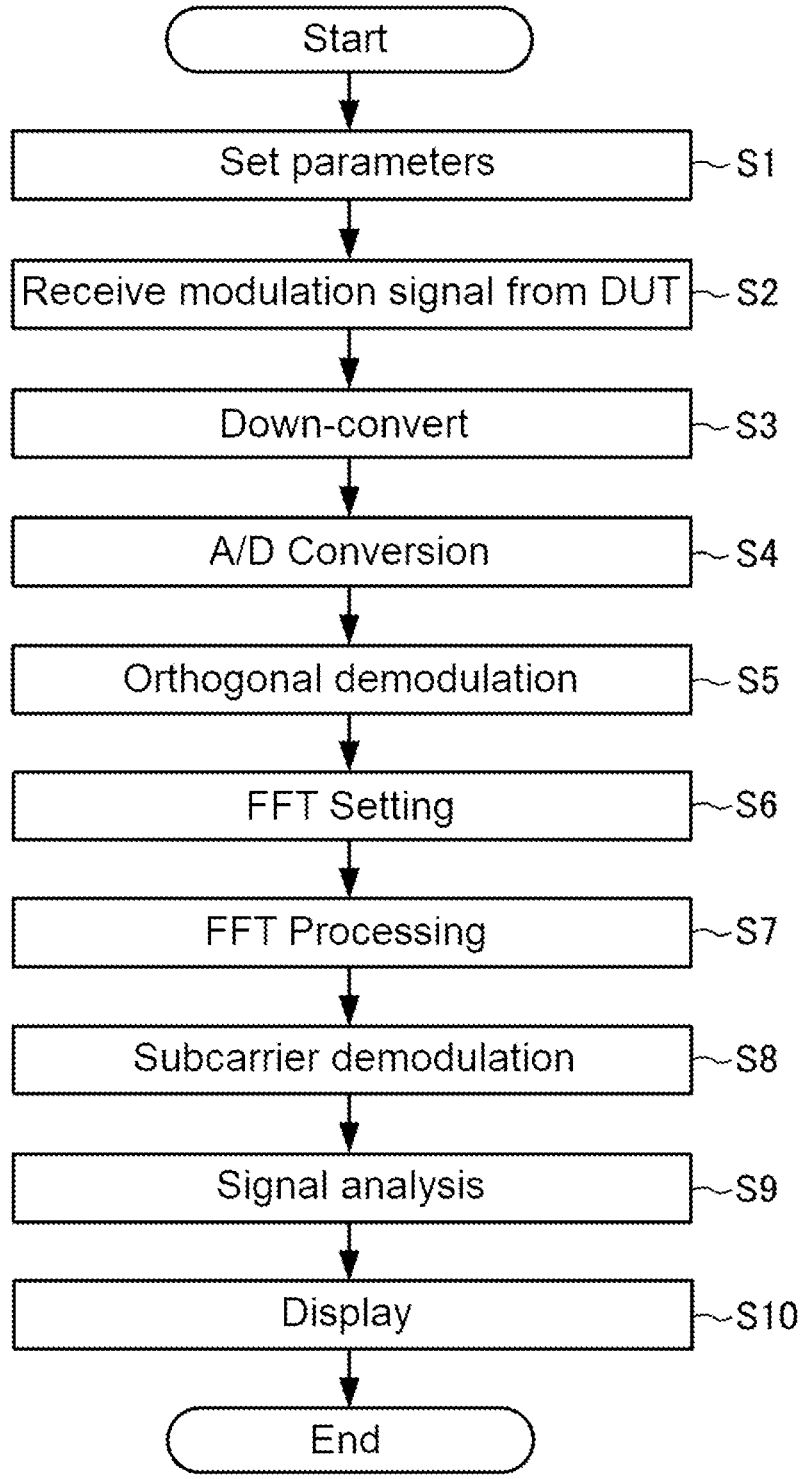
FIG. 6 is a diagram illustrating a flowchart of a mobile terminal test method according to the embodiment of the present invention.
Figure 7:
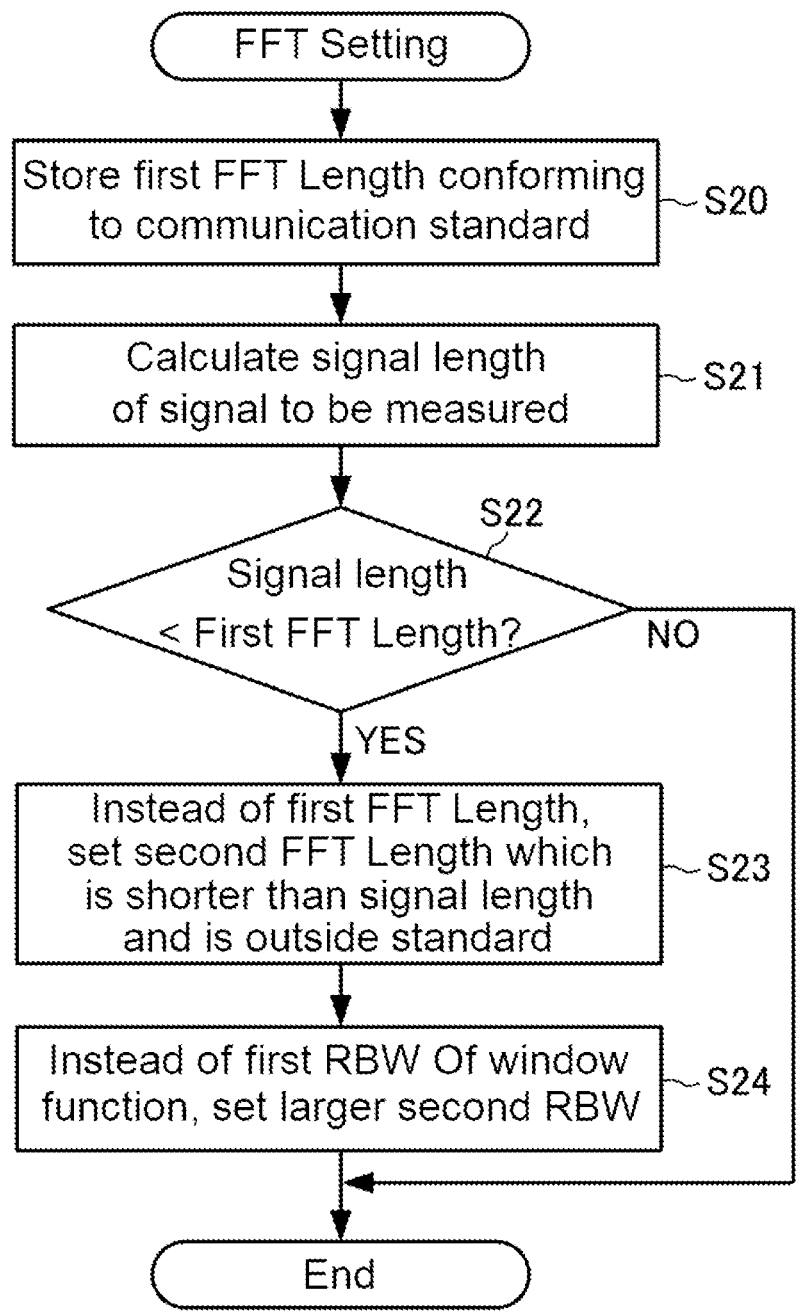
FIG. 7 is a diagram illustrating a flowchart of the mobile terminal test method according to the embodiment of the present invention.

Next, a mobile terminal test method performed using the mobile terminal test apparatus 1 according to the embodiment of the present invention will be described with reference to FIGS. 1, 6, and 7.

The user operates the operation unit 60 under the control of the control unit 70 to set various parameters such as spectrum measurement function ON/OFF, in addition to measurement items, measurement conditions, and determination conditions when testing the DUT 2 (step S1).

The DUT 2 transmits a modulation signal a modulated by the OFDM modulation method, conforming to the communication standard. The DUT 2 may transmit a short modulation signal a outside the standard. The modulation signal a is also referred to as a signal to be measured.

The reception unit 10 receives the modulation signal a from the DUT 2 via the antenna or by wire (step S2). The received modulation signal a is sent to the down converter 11.

The down converter 11 down-converts the modulation signal a transmitted from the DUT 2 into an intermediate frequency signal b having an intermediate frequency (step S3). The intermediate frequency signal b is sent to the A/D conversion unit 12.

The A/D conversion unit 12 samples the analog intermediate frequency signal b to generate the digital intermediate frequency signal c (step S4). Sampling is performed, for example, 14640 times, 30720 times, or 61440 times per 14 symbols (1 slot). The digital intermediate frequency signal c is sent to the orthogonal demodulation unit 13.

The orthogonal demodulation unit 13 orthogonally demodulates the digital intermediate frequency signal c sent from the A/D conversion unit 12 to the baseband signal to generate an orthogonal demodulation signal d (step S5). The orthogonal demodulation signal d is a complex signal in the time domain and has an I-phase component and a Q-phase component. The orthogonal demodulation signal d is sent to the signal processing unit 20 and the setting unit 30. The orthogonal demodulation signal d may be temporarily stored in a storage device (not shown) and sent from the storage device to the signal processing unit 20 and the setting unit 30.

The setting unit 30 sets parameters that specify the FFT process performed by the FFT processing unit 21 of the signal processing unit 20, which will be described in detail later (step S6). For example, all or part of the FFT processing parameters such as the FFT length and the RBW of the window function may be initially set in the FFT processing unit 21, with parameters conforming to the communication standard as the default, or may be input by the user operating the operation unit 60.

The FFT processing unit 21 of the signal processing unit 20 performs an FFT process on the orthogonal demodulation signal d of the time domain output by the orthogonal demodulation unit 13 to acquire the frequency domain signal e (step S7). Specifically, the FFT processing unit 21 multiplies the time-series sample sequence constituting the orthogonal demodulation signal d by a window function to cut out the data sequence, and performs the FFT operation on the cut-out data sequence. While shifting the position (sample number) at which the window function is to be multiplied in the sample sequence by a predetermined step, the signal cutout and the FFT operation are repeated over the entire range of the sample sequence to acquire the frequency domain signal e. The frequency domain signal e is sent to the subcarrier demodulation unit 22, and, if necessary, the analysis unit 40.

The subcarrier demodulation unit 22 performs a demodulation process for each subcarrier from the frequency domain signal e to acquire the OFDM demodulation signal f (step S8). The demodulation process for each subcarrier is a demodulation process corresponding to the modulation method performed for each subcarrier in the DUT 2, and examples thereof include Binary Phase Shift Keying (BPSK), Quadrature Phase Shift Keying (QPSK), 8 Phase Shift Keying (PSK), 16 Quadrature Amplitude Modulation (QAM), 64QAM, and the like. The OFDM demodulation signal f is sent to the analysis unit 40.

The analysis unit 40 measures and analyzes, for example, transmission power, EVM, constellation, spectrum, and the like with respect to the OFDM demodulation signal f or the frequency domain signal e (step S9).

The display unit 50 displays information g such as measurement and analysis result data and graphs obtained by the analysis unit 40 in step S8 (step S10).

(Setting Process)

Next, the FFT setting process (step S6) by the setting unit 30 will be described with reference to FIG. 7.

The FFT length storage unit 32 stores a predetermined first FFT length conforming to the communication standard, which is set as the FFT length of the FFT process applied to the sample signal acquired by the reception unit 10 (step S21).

The signal length calculation unit 31 calculates the signal length of the signal to be measured, based on the sample sequence constituting the orthogonal demodulation signal d output from the orthogonal demodulation unit 13 (step S22). Specifically, the signal length calculation unit 31 compares, for example, the power of each sample of the orthogonal demodulation signal d with a predetermined reference value, and when the power is larger than the reference value, determines that the signal is transmitted from DUT 2. The signal length of the signal to be measured is obtained from the number of samples whose power is larger than the reference value.

Next, the comparing unit 33 compares the signal length of the signal to be measured with the first FFT length stored in the FFT length storage unit 32 (step S23).

As a result of comparison by the comparing unit 33, when the signal length of the signal to be measured is equal to or greater than the first FFT length (NO in step S23), the FFT length setting unit 34 ends the FFT setting process. In this case, the FFT length in the FFT process remains the first FFT length. Alternatively, when the signal length of the signal to be measured is equal to or greater than the first FFT length (NO in step S23), the FFT length setting unit 34 may return the setting to the first FFT length, when an FFT length other than the first FFT length is set.

When as a result of the comparison by the comparing unit 33, the signal length of the signal to be measured is shorter than the first FFT length (YES in step S23), the FFT length setting unit 34 sets, instead of the existing first FFT length, a second FFT length which is shorter than the signal length of the signal to be measured and is outside the standard, as the FFT length of the FFT process (step S24).

Specifically, the FFT length setting unit 34 sets the second FFT length to maximum 2' which is equal to or less than the number of samples of one symbol at the sampling rate of the sampling performed by the reception unit 10. Where n is a natural number. By doing so, even when the signal length of the signal to be measured is only one symbol at worst, the FFT process can be appropriately performed. Further, since the second FFT length can be set to the shortest, the number of FFT sweeps can be increased.

When as a result of the comparison by the comparing unit 33, the signal length of the signal to be measured is shorter than the first FFT length, instead of an existing first RBW set as the RBW of the window function used in the FFT process, the RBW setting unit 35 sets a second RBW larger than the first RBW, as the RBW of the window function (step S24).

Specifically, the RBW setting unit 35 sets, when as a result of the comparison by the comparing unit 33, the signal length of the signal to be measured is shorter than the first FFT length, the second RBW as the RBW of the window function such that a maximum error assumed in the power measurement of the signal to be measured falls within a predetermined allowable range, based on information on the window function in a frequency domain display (FIG. 5) of a windowing process.

As a result of comparison by the comparing unit 33, when the signal length of the signal to be measured is equal to or greater than the first FFT length (NO in step S23), the RBW setting unit 35 ends the FFT setting process. In this case, the RBW of the window function used in the FFT process remains the first RBW. Alternatively, when the signal length of the signal to be measured is equal to or greater than the first FFT length (NO in step S23), the RBW setting unit 35 may return the setting to the first RBW, when an RBW other than the first RBW is set.

Next, the action and effect will be described.

As described above, in the receiving device 100 and the mobile terminal test apparatus 1 according to the present embodiment, when the signal length of the signal to be measured is shorter than the first FFT length conforming to the communication standard, the FFT length setting unit 34 sets, instead of the first FFT length, a second FFT length that is shorter than the signal length of the signal to be measured, and is outside the standard, as the FFT length of the FFT process by the FFT processing unit 21. With this configuration, it is possible to prevent the FFT process from being performed on a section in which there is substantially no data in the signal to be measured. Thus, in a test involving the FFT process, it is possible to handle not only a signal to be measured conforming to the communication standard but also a case where the signal length of a signal to be measured is short outside the standard, and perform the FFT process with high reliability.

When the FFT length is shortened by the FFT length setting unit 34, the problem that the FFT operation is performed on a section where there is substantially no data is solved, but the sample interval on the frequency axis becomes large, and if the window function specified in the communication standard remains, the maximum error in the power measurement of the signal to be measured becomes large. In the receiving device 100 and the mobile terminal test apparatus 1 according to the present embodiment, the RBW setting unit 35 sets, instead of a predetermined first RBW conforming to the communication standard as the RBW of the window function used in the FFT process, a second RBW larger than the first RBW, as the RBW of the window function. With this configuration, an increase in the maximum error in power measurement due to the shortening of the FFT length can be suppressed.

As described above, the present invention has an effect that it is possible to handle a case where the signal length of a signal to be measured is short outside the standard in a test involving an FFT process and perform an FFT process with high reliability, and is useful for a receiving device, a mobile terminal test apparatus provided with the receiving device, and a mobile terminal test method in general.

DESCRIPTION OF REFERENCE NUMERALS AND SIGNS

1 Test apparatus (mobile terminal test apparatus)
2 Device under test (DUT)
10 Reception unit
11 Down converter
12 A/D conversion unit
13 Orthogonal demodulation unit
20 Signal processing unit
21 FFT processing unit
22 Subcarrier demodulation unit
30 Setting unit
31 Signal length calculation unit
32 FFT length storage unit
33 Comparing unit
34 FFT length setting unit
35 Resolution bandwidth setting unit (RBW setting unit)
40 Analysis unit
50 Display unit
60 Operation unit
70 Control unit
100 Receiving device
a Modulation signal (signal to be measured)
b Intermediate frequency signal
c Digital intermediate frequency signal
d Orthogonal demodulation signal (sample signal)
e Frequency domain signal
f OFDM demodulation signal
T1, T3 Time length of sample sequence (signal length of signal to be measured)
T2 Window function section width (first FFT length)
T4 window function section width (second FFT length)

What is claimed is:

1. A receiving device comprising
a receiver configured to sample a signal to be measured transmitted from a device under test and acquires a sample signal; and
a processor configured to:
  perform an FFT process by multiplying the sample signal acquired by the reception unit by a window function;
  calculate a signal length of the signal to be measured from the sample signal acquired by the receiver;
  compare the calculated signal length of the signal to be measured with a first FFT length conforming to a communication standard; and when as a result of the comparison, the signal length of the signal to be measured is shorter than the first FFT length:
  instead of the first FFT length, set a second FFT length shorter than the signal length of the signal to be measured, as the FFT length of the FFT process; and
  instead of a predetermined first resolution bandwidth conforming to the communication standard as a resolution bandwidth of the window function used in the FFT process, set a second resolution bandwidth larger than the first resolution bandwidth, as the resolution bandwidth of the window function.

2. The receiving device according to claim 1, wherein the processor is further configured to, when as the result of the comparison, the signal length of the signal to be measured is shorter than the first FFT length, set the second resolution bandwidth as the resolution bandwidth of the window function such that a maximum error assumed in power measurement of the signal to be measured falls within a predetermined allowable range, based on information on the window function in a frequency domain display of a windowing process.

3. The receiving device according to claim 2, wherein the processor is further configured to the FFT length setting unit, when as the result of the comparison, the signal length of the signal to be measured is shorter than the first FFT length, set the second FFT length to maximum $2^n$ which is equal to or less than the number of samples of one symbol at a sampling rate of the sampling performed by the receiver, where n is a natural number.

4. The receiving device according to claim 1, wherein the processor is further configured to, when as the result of the comparison, the signal length of the signal to be measured is shorter than the first FFT length, set the second FFT length to maximum $2^n$ which is equal to or less than the number of samples of one symbol at a sampling rate of the sampling performed by the receiver, where n is a natural number.

5. The receiving device according to claim 1, wherein the processor is further configured to, when as the result of the comparison, the signal length of the signal to be measured is shorter than the first FFT length, set the second FFT length to maximum $2^n$ which is equal to or less than the number of samples of one symbol at a sampling rate of the sampling performed by the receiver, where n is a natural number.

6. A mobile terminal test apparatus comprising
a receiving device including:
  a receiver configured to sample a signal to be measured, transmitted from a device under test, and acquires a sample signal; and
  a processor configured to:
    perform an FFT process by multiplying the sample signal acquired by the receiver by a window function,
    calculate a signal length of the signal to be measured from the sample signal acquired by the receiver,
    compare the calculated signal length of the signal to be measured with a first FFT length conforming to a communication standard,
    analyze the signal; and
    when as a result of the comparison, the signal length of the signal to be measured is shorter than the first FFT length:
      instead of the first FFT length, set a second FFT length shorter than the signal length of the signal to be measured, as the FFT length of the FFT process, and
      instead of a predetermined first resolution bandwidth conforming to the communication standard as a resolution bandwidth of the window function used in the FFT process, set a second resolution bandwidth larger than the first resolution bandwidth, as the resolution bandwidth of the window function; and
a display configured to display a result of the analysis.

7. The mobile terminal test apparatus according to claim 6, wherein
the processor is further configured to, when as the result of the comparison, the signal length of the signal to be measured is shorter than the first FFT length, set the second resolution bandwidth as the resolution bandwidth of the window function such that a maximum error assumed in power measurement of the signal to be measured falls within a predetermined allowable range, based on information on the window function in a frequency domain display of a windowing process.

8. The mobile terminal test apparatus according to claim 6, wherein
the processor is further configured to, when as the result of the comparison, the signal length of the signal to be measured is shorter than the first FFT length, set the second FFT length to maximum $2^n$ which is equal to or less than the number of samples of one symbol at the sampling rate of the sampling performed by the receiver, where n is a natural number.

9. A mobile terminal test method comprising:
a reception step of sampling a signal to be measured, the signal transmitted from a device under test, and acquiring a sample signal;
an FFT processing step of performing an FFT process by multiplying the sample signal acquired in the reception step by a window function;
a signal length calculation step of calculating a signal length of the signal to be measured from the sample signal acquired in the reception step;
a comparison step of comparing the calculated signal length of the signal to be measured with a first FFT length conforming to a communication standard as an FFT length of the FFT process;
an FFT length setting step of, when as a result of the comparison in the comparison step, the signal length of the signal to be measured is shorter than the first FFT length, instead of the first FFT length, setting a second FFT length shorter than the signal length of the signal to be measured, as the FFT length of the FFT process in the FFT processing step;
a resolution bandwidth setting step of, when as the result of the comparison in the comparison step, the signal length of the signal to be measured is shorter than the first FFT length, instead of a predetermined first resolution bandwidth conforming to the communication standard as the resolution bandwidth of the window function used in the FFT process, setting a second resolution bandwidth larger than the first resolution bandwidth, as the resolution bandwidth of the window function;
an analysis step of analyzing a signal obtained in the FFT processing step; and a display step of displaying a result of analysis in the analysis step.

\* \* \* \* \*